(12) United States Patent
Otsuki

(10) Patent No.: US 8,428,865 B2
(45) Date of Patent: Apr. 23, 2013

(54) NAVIGATION SYSTEM AND ROADWAY SEARCH METHOD

(75) Inventor: Kohei Otsuki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1188 days.

(21) Appl. No.: 12/016,828

(22) Filed: Jan. 18, 2008

(65) Prior Publication Data

US 2008/0221786 A1    Sep. 11, 2008

(30) Foreign Application Priority Data

Mar. 5, 2007    (JP) .................................. 2007-54744

(51) Int. Cl.
*G06C 21/00*    (2006.01)

(52) U.S. Cl.
USPC .......................................... 701/400; 701/532

(58) Field of Classification Search .......... 701/200–201; 705/400, 532
See application file for complete search history.

(56) References Cited

U.S. PATENT DOCUMENTS

| | | | |
|---|---|---|---|
| 5,359,527 A | | 10/1994 | Takanabe et al. |
| 6,587,787 B1 | | 7/2003 | Yokota |
| 7,711,478 B2 * | | 5/2010 | Gluck ........................... 701/208 |
| 2004/0215390 A1 * | | 10/2004 | Nomura ......................... 701/209 |
| 2008/0097698 A1 * | | 4/2008 | Arnold-Huyser et al. ..... 701/300 |
| 2009/0271105 A1 * | | 10/2009 | Kindo et al. ................... 701/201 |
| 2009/0309758 A1 * | | 12/2009 | Gueziec ........................ 340/905 |
| 2010/0204913 A1 * | | 8/2010 | Schmitz ........................ 701/200 |
| 2011/0122157 A1 * | | 5/2011 | Fabre et al. ................... 345/661 |
| 2012/0239296 A1 * | | 9/2012 | Schmitz ........................ 701/538 |

FOREIGN PATENT DOCUMENTS

| | | |
|---|---|---|
| JP | 02-210599 | 8/1990 |
| JP | 2002-116042 | 4/2002 |
| JP | 2005-37128 | 2/2005 |
| JP | 2006-300834 | 11/2006 |
| JP | 2007-010549 | 1/2007 |

\* cited by examiner

*Primary Examiner* — Luke Gilligan
(74) *Attorney, Agent, or Firm* — Brinks Hofer Gilson & Lione

(57) ABSTRACT

The present invention provides a navigation system and roadway search method capable of easily searching for a roadway even if a user does not accurately know the name of the roadway. The navigation system includes an icon display unit that displays roadway icons by road type on a screen, and a search key setting unit that specifies a road type corresponding to the icon selected from the icons displayed on the screen, and sets a roadway name corresponding to the icon selected from the icons displayed on the screen as a search key through a user operation. The navigation system displays icons on the screen that are constituted by marks that are similar to marks actually used for roadways in paper maps or road signs. Thus the user is able to search for a roadway without needing to know the complete name of the desired roadway.

12 Claims, 11 Drawing Sheets

FIG.6(d)
FIG.6(c)
FIG.6(a)
FIG.6(b)

FIG.9(a)

ROAD SEARCH

PLEASE INPUT STREET NAME

10

| 0 | 1 | 2 | 3 | 4 | 5 | 6 | 7 | 8 | 9 |
| A | B | C | D | E | F | G | H | I | J |
| K | L | M | N | O | P | Q | R | S | T |
| U | V | W | X | Y | Z | − | + | . | , |

FIG.9(b)

PLEASE SELECT ROAD

| GENERAL ROAD | 10TH STREET |
|---|---|
| GENERAL ROAD | 10TH AVENUE |
| 🛡10 | I-10 |
| ⬡10 | CA-10 |
| ▦10 | US-10 |

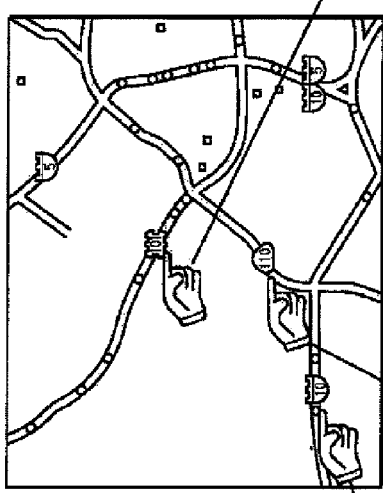

NAVIGATION SYSTEM AND ROADWAY SEARCH METHOD

The present application claims priority to Japanese Patent Application Number 2007-54744, filed Mar. 5, 2007, the entirety of which is hereby incorporated by reference.

FIELD OF THE INVENTION

The present invention relates to a navigation system and a roadway search method, and is particularly preferable for use in a navigation system equipped with a function capable of inputting a road name to search for a destination or a transit point on a guidance route.

DESCRIPTION OF THE RELATED ART

Generally, an on-vehicle navigation system detects the present position of a vehicle by using a dead reckoning sensor and a GPS (Global Positioning System) receiver or the like. The navigation system reads map data stored on a recording medium corresponding to an area near the detected location for the vehicle and displays the relevant map data on a screen. The system then displays a vehicle position mark indicating the position of the vehicle at a predetermined area on the screen in a superposed manner. In this way it is possible for the user of the navigation system to know where the vehicle is currently traveling, even at a glance.

Further, a route guidance function is included in most navigation systems. The route guidance function automatically searches for a route of lowest cost that connects the vehicle's current position to a destination using map data, and draws the searched route in a bold line as a guidance route on the display using a color that is different from the other roads shown on the display. Further, the function guides a driver to the destination by displaying a magnified intersection view when the vehicle approaches within a predetermined distance of an intersection on the guidance route.

Generally, these types of navigation systems include several methods for setting a destination (including a transit point). For example, there are known systems that are designed to search a specific point by inputting Japanese syllables, inputting an address, inputting a telephone number, inputting a postal code, and inputting the latitude/longitude or the like of a facility name or a point name. Further, existing navigation systems may search a specific point from facility genres, points previously searched, or points that a user has registered.

Moreover, a technique of specifying a destination by inputting a street name is also proposed in Japanese Laid-Open Patent Document Publication No. 2002-116042. In Japanese Laid-Open Patent Document Publication No. 2002-116042, when a city name and a name of street that runs through the city are input into the navigation system, the navigation system checks whether or not the street passes through a plurality of districts in the city. If the street passes through a plurality of districts, the plurality of districts are displayed on the display screen, and the destination is specified by the inputted city name, street name, and district name.

In another existing method, the names of two roads are input to the navigation system, and a point where the two roads cross is specified as a destination.

In the U.S. there are a number of different types of roadways, such as interstate highways, U.S. highways, and state highways. Additionally, in the U.S. each type of highway has a specific prefix associated with the road type, for example "I" for interstate highways, "U.S." for U.S. highways, and "CA" for California state highways. Therefore, when inputting the name of a roadway in the U.S., the characters corresponding to the fixed prefix such as "I-", "US-" and "CA-" must be input into the navigation system for each roadway. For example, when searching for interstate highway No. 10, U.S. highway No. 101, and California State Highway No. 110, the prefixes "I-10", "US-101" and "CA-110" need to be input respectively.

However, in practice, roadways are often only displayed as marks on road signs and maps. Thus, it is difficult for a user, who does not know which mark corresponds to which roadway, to know which of type of roadway (e.g. an interstate highway, a U.S. highway, or a state highway, etc.) corresponds to the roadway that he/she wants to search with the navigation system. Further, even a user who is familiar with the meaning of the marks sometimes does not know which prefix corresponds to a particular mark. Consequently, users of existing navigation systems are often unable to input and search for their desired roadway or destination.

SUMMARY OF THE INVENTION

The present invention has been created to solve such problems, and it is an object of the invention to allow a user to easily search for a roadway using an icon corresponding to each road type, even if he/she does not accurately know the name of the roadway.

To solve the above-described problems, in the present invention, icons are prepared for each type of roadway, and displayed on the screen of a display. The user is then able to select an icon corresponding to the desired roadway and the navigation system sets the icon as a roadway search key. It is preferable that the displayed icons are constituted by icons similar to the marks that are actually used on maps and/or road signs.

BRIEF DESCRIPTION OF THE DRAWINGS

FIG. 6a-d illustrate examples of screens displayed on a display device when searching for a roadway according to the second embodiment.

FIGS. 9a-b illustrate examples of screens displayed on a display device when searching for a roadway according to the third embodiment.

FIGS. 11a-d illustrate examples of screens displayed on a display device when searching for a roadway according to a fourth embodiment.

PREFERRED EMBODIMENTS OF THE INVENTION

First Embodiment

Figure 1:
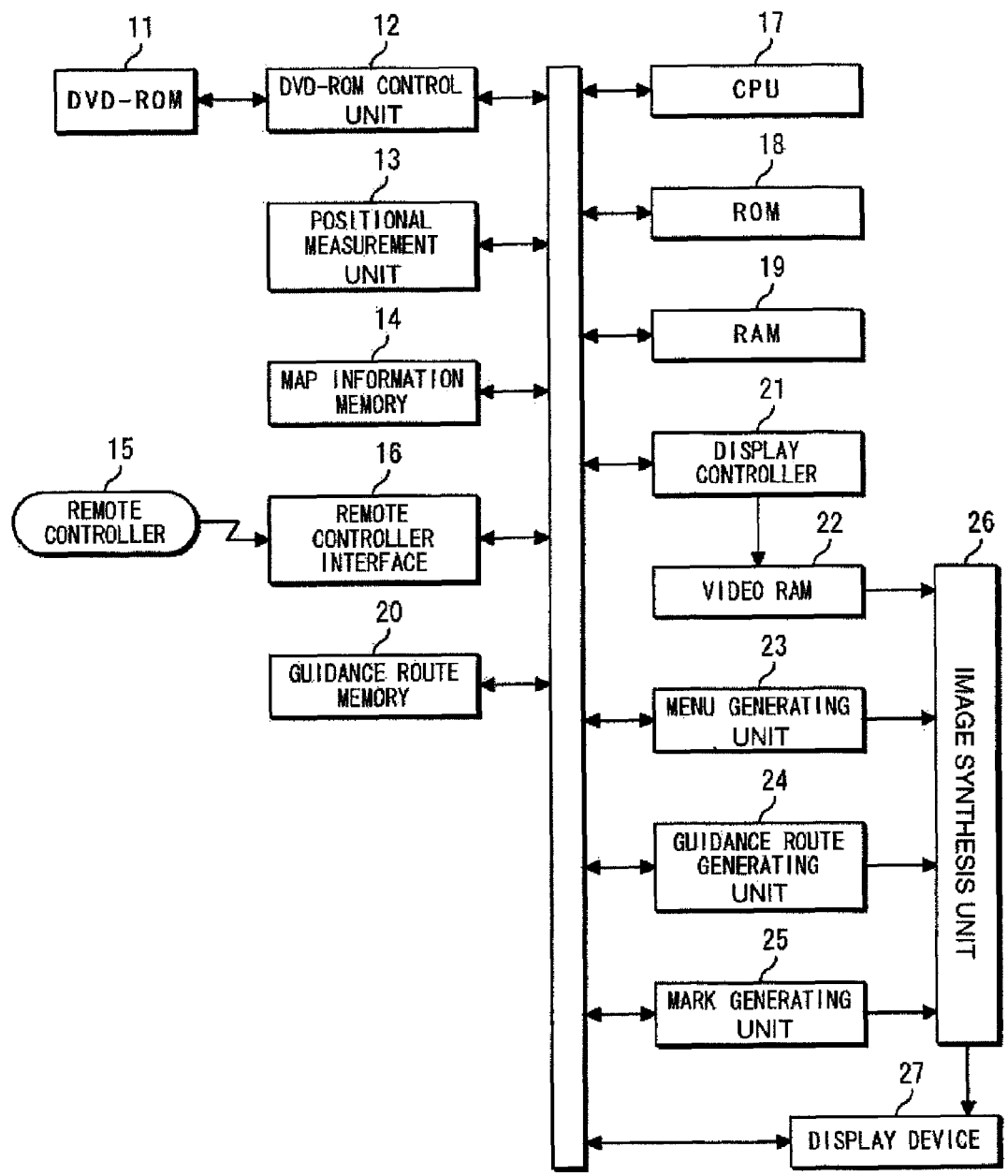
FIG. 1 is a block diagram of the navigation system according to a first, second, third, and fourth embodiment.

Hereinafter, embodiments of the present invention will be described with reference to the accompanying drawings. FIG. 1 is a block diagram of the navigation system according to the first embodiment.

In FIG. 1, reference numeral 11 denotes a map recording medium such as a DVD-ROM (Digital Versatile Disk-Read Only Memory), which stores various map data necessary to display a map, or perform a route search. The DVD-ROM 11 is used as a recording medium to store map data, however, it should be understood that other recording media such as a CD-ROM, a hard disc drive, or a semiconductor memory may also be used. Reference numeral 12 denotes a DVD-ROM control unit, which controls the reading of map data from DVD-ROM 11.

The map data stored on the DVD-ROM 11 includes a drawing unit that includes various data necessary for map display, and a road unit that includes data used in various processes such as map matching, route searching, and route guidance. The drawing unit includes background layer data used to display buildings and geographical features such as rivers or the like, and character layer data used to display municipality names, and road names or the like.

The drawing unit also includes icon layer data used to display various icons representing items such as landmarks, gas/service stations, convenience stores or the like, and road signs that identify road types. Roadway icons (road sign marks/icons) are prepared for each road type such as interstate highways, U.S. highways, and state highways. The icon data for each road type is stored and associated with road type information.

The road unit includes data regarding nodes corresponding to crossing points of a plurality of roads, such as intersections and forks. The road unit also includes data regarding links corresponding to roads and traffic lanes or the like, which connect a node on a road and other nodes located adjacent to the node on the road. Specifically, the road unit includes a connection node table storing detailed data regarding all nodes and a link table that stores links between each node and the two nodes adjacent thereto.

The connection node table includes information for each node such as the normalized longitude/latitude of the node, attribute flags, and a node connection record. The attribute flags include node intersection flags and the like, which show whether or not the node is an intersection node. The node connection record includes data such as a link number for each link for which the node constitutes an end of the link.

The link table includes information such as link ID data, node numbers, link distance, link cost, road attribute flags, road type flags and route numbers. The link ID includes a code applied to each link used to display a searched route. The node number includes a number identifying the nodes that are positioned at the two ends of the link. The link distance shows the distance of the actual road corresponding to the link.

The link cost is a value obtained by multiplying a distance by, for example, a predetermined constant corresponding to a road width, road type, right/left turn data, and traffic regulations or the like. The link cost is a quantified proper level of the guidance route. The road attribute flags show various attributes of the link. The road type flags show whether the road corresponding to the link is a general road or a highway. In the event the road is a highway, the road attribute flags also show the type of highway corresponding to the road, such as an interstate highway, a U.S. highway, or a state highway. The route number shows a number applied to the actual road corresponding to the link.

Reference numeral 13 denotes a positional measurement unit that measures the present position of a vehicle, and includes a dead reckoning sensor, a GPS receiver, and a CPU for positional calculation and the like. The positional measurement unit 13 also includes a self-contained navigation sensor, including a vehicle speed sensor (distance sensor) that outputs a pulse at a predetermined travel distance. The pulse is output to detect the distance the vehicle has moved. The self-contained navigation sensor also includes an angular velocity sensor (relative azimuth sensor) such as a vibration gyro that detects the rotation angle (movement azimuth) of the vehicle. The dead reckoning sensor detects the relative position and azimuth of the vehicle utilizing the vehicle speed sensor and the angular velocity sensor.

The CPU for positional calculation calculates an absolute vehicle position (the estimated position of the vehicle on which the navigation system is mounted) and a vehicle azimuth calculated based on the relative position and azimuth output by the self-contained navigation sensor. Further, the GPS receiver receives radio waves sent from a plurality of GPS satellites by a GPS antenna, and performs three-dimensional position processing or two-dimensional position processing to calculate the absolute position and azimuth of the vehicle (the vehicle azimuth is calculated based on the present position of the vehicle and the previous position of the vehicle calculated one sampling time $\Delta T$ earlier).

Reference numeral 14 denotes a map information memory that temporarily stores map data read from the DVD-ROM 11 by the control of the DVD-ROM control unit 12. Specifically, the DVD-ROM control unit 12 inputs the current vehicle position information from a positional measurement unit 13 and outputs a read-out instruction for map data of a predetermined range that contains the current position of the vehicle. The DVD-ROM control unit 12 reads out map data necessary to search for a map display or guidance route from the DVD-ROM 11, and stores the map data in the map information memory 14. The map data stored on the map information memory 14 includes icons for each of the road types described above, as well as road type information associated with the icons. As described above, the map information memory 14 may also be described more generally as an information storage unit.

Reference numeral 15 denotes a remote controller, which may be more generally described as an operating unit, which is equipped with various operator features (e.g. buttons, joystick, numeric keypad and the like) that are used by the user to set various information (e.g., destination or transit point on the guidance route) in the navigation system or to perform various operations (e.g., menu-selection, magnifying/reducing, manual map scroll, character input and the like). Reference numeral 16 denotes a remote controller interface that receives an infrared or other electrical signal from the remote controller 15 in response to its operation state.

Reference numeral 17 denotes a processor (CPU) configured to control the navigation system. Reference numeral 18 denotes a ROM that is configured to store various programs (roadway search program, guidance route search processing program and the like). Reference numeral 19 denotes a RAM that is configured to temporarily store data obtained through various processes, or data obtained as a result of various processes. Note that the CPU 17, the ROM 18 and the RAM 19 constitute the search key setting unit and the mode setting unit of the present invention (described later in detail).

The CPU 17 executes a roadway search process by setting a destination (including a transit point) for a guidance route according to a roadway search program stored on the ROM 18. Further, the CPU 17 executes a process for searching a guidance route having the lowest cost that connects the current position of the vehicle to the destination using map data stored on the map information memory 14 according to a guidance route search processing program stored on the ROM 18. In the roadway search program it is possible to set an intersection of two roads extracted by the process described above as a destination.

Reference numeral 20 denotes a guidance route memory that stores data from the guidance route searched by the CPU 17. The guidance route data includes the position of each node and an intersection identification flag showing whether or not each node is an intersection for each node between the current position of the vehicle and the destination.

Reference numeral 21 denotes a display controller that generates map image data used to display map data stored on the map information memory 14 on a display device 27. Reference numeral 22 denotes a video RAM that temporarily stores map image data generated by the display controller 21. Specifically, the map image data generated by the display controller 21 is temporarily stored on the video RAM 22, and the map image data for one screen is read and output to an image synthesis unit 26.

Reference numeral 23 denotes a menu generating unit that generates and outputs menu images used to perform various operations, and receive input from the remote controller 15. The menu image generated by the menu generating unit 23 also includes a menu image used in searching for a roadway. Icons prepared for the different types of roadways exist in a menu image used for roadway searches. Note that the icon display unit comprises the CPU 17, the ROM 18 and the RAM 19. The menu generating unit 23 generates a menu image containing the above-described icons upon receiving an instruction from the icon display unit:

Reference numeral 24 denotes a guidance route generating unit that generates drawing data for the guidance route using the output of the guidance route search process program stored on the guidance route memory 20. Specifically, data contained in a map area that is drawn in the video RAM 22 at the selected point is selectively read out of the guidance route data stored on the guidance route memory 20, and a guidance route is drawn on the map image in a superposed manner using a bold line in a predetermined color. Further, when the vehicle approaches a predetermined distance of an intersection on the guidance route, the guidance map image of the intersection is generated and output.

Reference numeral 25 denotes a mark generating unit that generates and outputs a vehicle position icon/mark displayed at the position of the vehicle on the map displayed on the display device 27 after a map matching process has been performed. Various icons representing landmarks, gas stations, convenience stores and the like, as well as road sign marks are displayed on the roads of the displayed map. Note that the map matching process is performed by determining the correct position of the vehicle on the displayed map using the map data read out from the map information memory 14, vehicle position data, and a vehicle azimuth as measured by the GPS receiver. The GPS receiver measures the vehicle azimuth using the positional measurement unit 13, an estimated vehicle position, and vehicle azimuth data calculated by the self-contained navigation sensor.

The above-described image synthesis unit 26 synthesizes various images and outputs a synthesized image. Specifically, each image data output from the menu generating unit 23, the guidance route generating unit 24, and the mark generating unit 25 is superposed on the map image data read out by the display controller 21 to perform image synthesis, and the map image is output to the display device 27. Thus, the map information displayed on the screen of the display device 27 includes map information for the area surrounding the vehicle, together with the vehicle position mark and various icons representing landmarks, road signs and the like. Additionally, the guidance route is also displayed on the map. When the vehicle approaches the vicinity of an intersection, a magnified intersection view may also be displayed on the display device.

Figure 2:
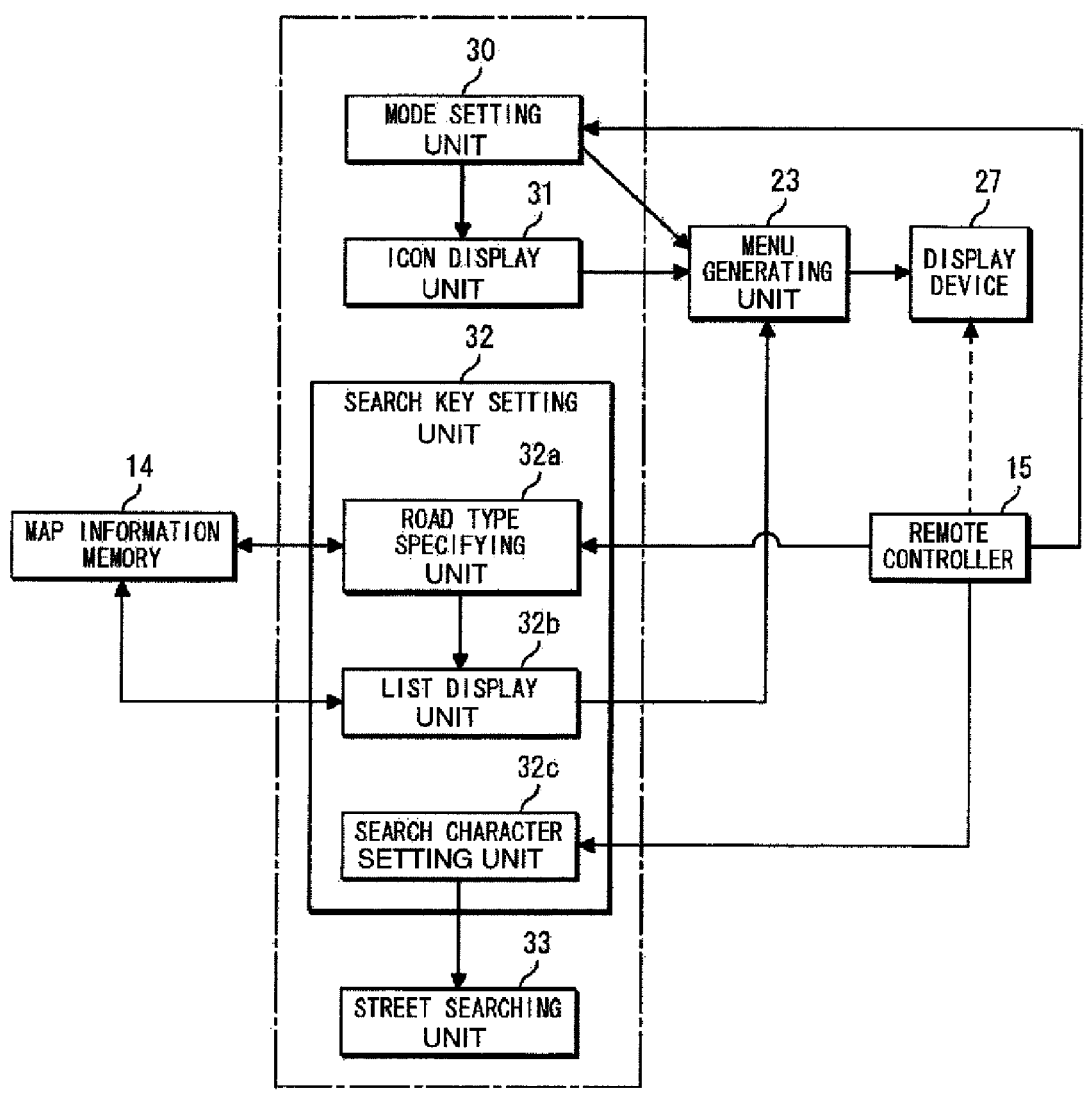
FIG. 2 is a block diagram of the roadway search unit of the navigation system of the first embodiment.

FIG. 2 is a block diagram of the roadway search unit of the navigation system according to the first embodiment. In FIG. 2, the elements having like reference numerals as the reference numerals shown in FIG. 1 have the same functions as the elements described above with regard to FIG. 1. In FIG. 2, a mode setting unit 30 sets the operational mode to a search mode through a user operation of the remote controller 15.

Specifically, in the navigation system of this embodiment, a plurality of search modes such as the Japanese syllable input search mode, address input search mode, telephone number input search mode, postal code input search mode, latitude/longitude input search mode, facility genre search mode, and road search mode are prepared as modes for searching for the destination of a guidance route. The road search mode includes two search modes: a highway search mode, and a street search mode. The highway search mode allows a user to search for a target highway using a highway type icon. The street search mode allows a user to search for a target road by directly inputting the target road's name. The mode setting unit 30 accepts the setting of any search mode specified through a user operation of the remote controller 15.

Meanwhile, when the road search mode is set by inputting the names of two roads as search keys, a crossing point (intersection, etc.) of the two detected roads is specified as a destination.

An icon display unit 31 controls the menu generating unit 23 which generates a menu image containing icons corresponding to roadways by road type, displays it on the screen of the display device 27, and prompts the user to select an icon. In this embodiment, the icon display unit 31 displays a list of icons by each road type on the screen of the display device 27 when the highway search mode is set by the mode setting unit 30.

When the highway search mode is set, the search key setting unit 32 sets the name of the road type corresponding to the icon selected out of the icons displayed on the screen by the icon display unit 31 as a search key for a highway search through a user operation of the remote controller 15. Further, when the street search mode is set, the search key setting unit 32 sets the road name directly input through a user operation of the remote controller 15 as the search key.

Specifically, the search key setting unit 32 is equipped with a road type specifying unit 32a, a list display unit 32b, and a search character setting unit 32c. The road type specifying unit 32a specifies road type information corresponding to an icon selected out of the icons displayed on the screen of the display device 27 by the icon display unit 31 through a user operation of the remote controller 15. The road type specifying unit 32a also specifies road type information corresponding to a selected icon by referring to icon layer data that is contained in the map data stored on the map information memory 14 (information storage unit). Specifically, when an icon corresponding to an interstate highway is selected, for example, the road type information "interstate highway" is specified. Further, when an icon corresponding to a U.S. highway is selected, the road type information "U.S. highway" is specified.

The list display unit 32*b* obtains one or more roadway names corresponding to the road type from map data stored on the map information memory 14, based on the road type information specified by the road type specifying unit 32*a*. The display unit 32*b* also displays a list of roadways on the display device 27, and prompts the user to select a roadway name.

As described above, the link table includes road type flags expressing road types and route number information for roads. Links corresponding to a road type specified by the road type specifying unit 32*a* may be retrieved by referring to the road type flags. Further, the roadway name may be obtained by adding a route number after a prefix corresponding to a road type using the appropriate route number information that links the obtained road type flags.

Specifically, one or more links corresponding to a road type specified by the road type specifying unit 32*a* exist in the map data, and route number information is added to each link. Thus, the list display unit 32*b* extracts one or more roadways corresponding to the road type specified by the road type specifying unit 32*a* out of a large number of roadways that exist in the map data. The list display unit 32*b* controls the menu generating unit 23 and displays a list of one or more roadway names extracted from the menu screen.

In the highway search mode, the search character setting unit 32*c* sets the roadway name selected from the list of displayed roadway names as a search key through a user operation of the remote controller 15. Further, in the street search mode, the search character setting unit 32*c* sets a road name directly input through a user operation of the remote controller 15 as a search key.

The street searching unit 33 searches map data stored on the map information memory 14 for a street corresponding to the street name set as the search key by the search key setting unit 32 (highway name or general road name). For example, by searching two roadways, a crossing point of the two roadways can be set as the destination for the guidance route.

Figure 3:
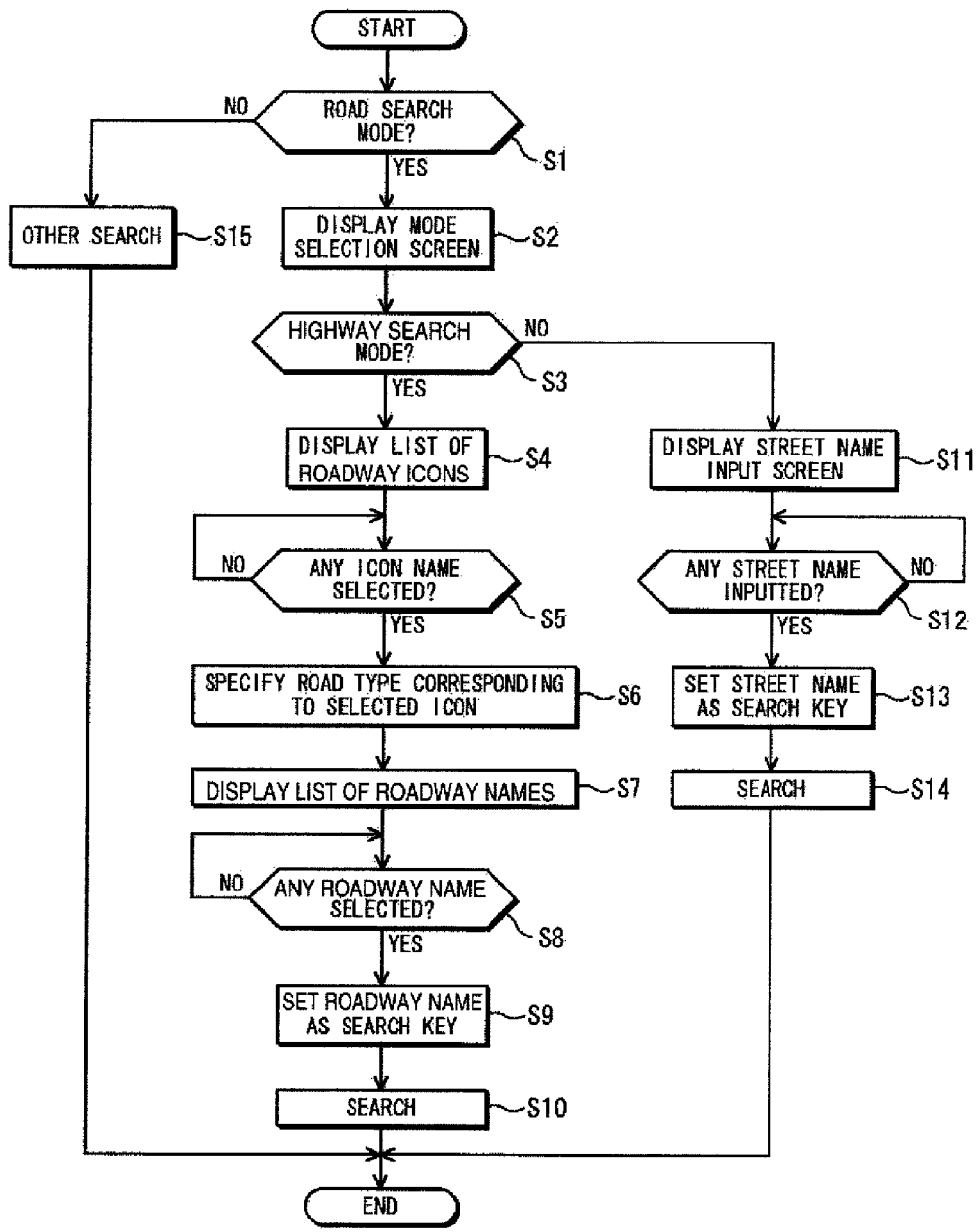
FIG. 3 is a flowchart of a roadway search method according to the first embodiment.
Figure 4:
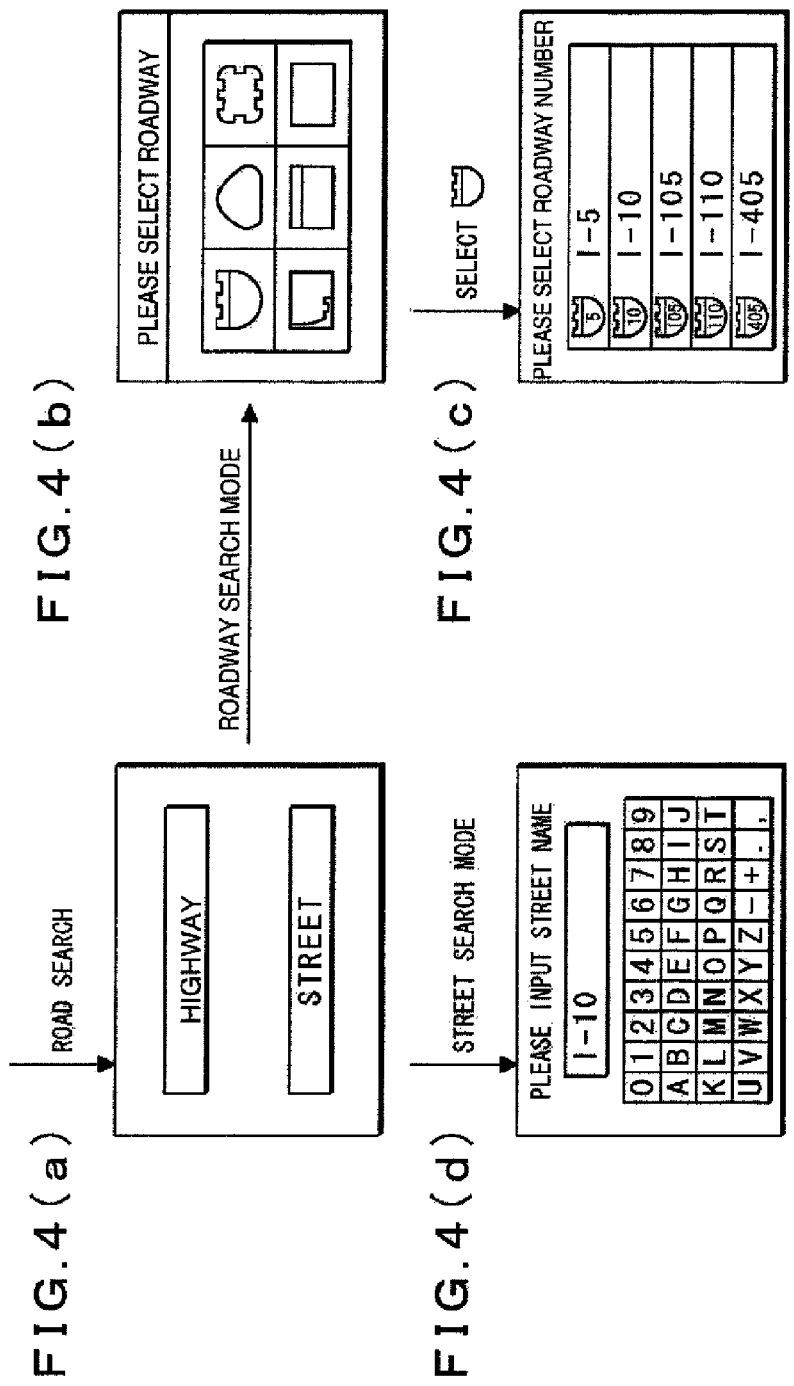
FIGS. 4a-d illustrate examples of screens displayed on a display device when searching for a roadway according to the first embodiment.

Next, a roadway search method according to the first embodiment shown in FIG. 3 will be described. FIG. 3 is a flowchart showing the roadway search process according to the first embodiment. FIG. 4 illustrates examples of screens displayed on the display device 27 when conducting a roadway search according to the first embodiment.

In FIG. 3, the mode setting unit 30 judges whether or not the road search mode has been set through a user operation of the remote controller 15 (step S1). In the case where the road search mode has not been set, that is, the mode setting unit 30 judges that another search mode was set, a point search is executed according to a predetermined or previously set search mode (step S15).

In the case where the mode setting unit 30 judges that the road search mode was set through a user operation of the remote controller 15, the menu generating unit 23 displays a selection screen including the highway search mode and the street search mode, as shown in FIG. 4(*a*), on the display device 27 upon receiving a signal from the mode setting unit 30 that the road search mode has been set (step S2). Subsequently, the mode setting unit 30 judges whether or not the highway search mode has been set on the selection screen through a user operation of the remote controller 15 (step S3).

In the case where the mode setting unit 30 judges that the highway search mode was set, the icon display unit 31 controls the menu generating unit 23 to display an icon selection screen, as shown in FIG. 4(*b*), on the display device 27 upon receiving a signal from the mode setting unit 30 that the highway search mode has been set (step S4). The icon selection screen is a list display of a plurality of icons prepared for each road type.

Subsequently, the road type specifying unit 32*a* judges whether or not any icon has been selected out of the icons displayed on the screen of the display device 27 by the icon display unit 31 through a user operation of the remote controller 15 (step S5). In the case where an icon has been selected, the road type specifying unit 32*a* specifies road type information corresponding to the selected icon by referring to icon layer data contained in the map data stored on the map information memory 14 (step S6).

Once the road type is specified, the list display unit 32*b* obtains one or more roadway names corresponding to the specified road type from the map data in the map information memory 14, and controls the menu generating unit 23 to display a list of roadway names (roadway selection screen) on the display device 27 (step S7). The list display of roadway names may display one or more extracted roadway names together with an icon corresponding to the road type as shown in FIG. 4(*c*). One or more icons corresponding to the roadway for each route number (the icons are in the shape of road sign marks in which the route number is written) displayed in this case may be previously prepared in the map data, or may be generated by synthesizing the figure of the route number with an icon having a shape only, as shown in FIG. 4(*b*).

Next, the search character setting unit 32*c* judges whether or not a roadway name has been selected out of the roadway names displayed in the list on the display device 27 by the list display unit 32*b* through a user operation of the remote controller 15 (step S8). In the case where a roadway name has been selected, the search character setting unit 32*c* sets the selected roadway name as a search key (step S9). Then, the street searching unit 33 searches the map data stored on the map information memory 14 for a roadway corresponding to the roadway name set as the search key by the search character setting unit 32*c* (step S10).

In the above-described act (step S3), in the case where the highway search mode has not been set, that is, the mode setting unit 30 judges that the street search mode was set, the menu generating unit 23 displays an input screen of street names as shown in FIG. 4(*d*) on the display device 27 upon receiving a signal from the mode setting unit 30 (step S11).

Subsequently, the search character setting unit 32*c* judges whether or not a street name (either a highway name or general road name may be acceptable) has been input through a user operation of the remote controller 15 (step S12). In the case where a street name has been inputted, the search character setting unit 32*c* sets the inputted street name as the search key (step S13).

The street searching unit 33 searches the map data stored on the map information memory 14 for a street corresponding to the street name set as a search key by the search character setting unit 32*c* (step S14). Thus, in the case where the user knows a street name, he/she can also search for the street by directly inputting the street name.

As described above in detail, in the first embodiment, icons similar to road sign marks for each road type are prepared and displayed in a list as in FIG. 4(*b*) in order to prompt the user to select a desired icon out of the displayed icons. The roadway names of the road type corresponding to the selected icon are then displayed in a list as in FIG. 4(*c*) to prompt the user select a desired roadway name from the displayed list of icons. The selected roadway name is then set as a search key.

In the first embodiment, even if the user does not accurately know a roadway name, he/she can specify the roadway name with the help of the displayed icons, which are similar to the marks used on road signs. Therefore, as long as the user knows the icon and the route number of a desired roadway, he/she can easily search the target roadway even if he/she does not accurately know which prefix corresponds to the desired road.

Second Embodiment

Figure 5:
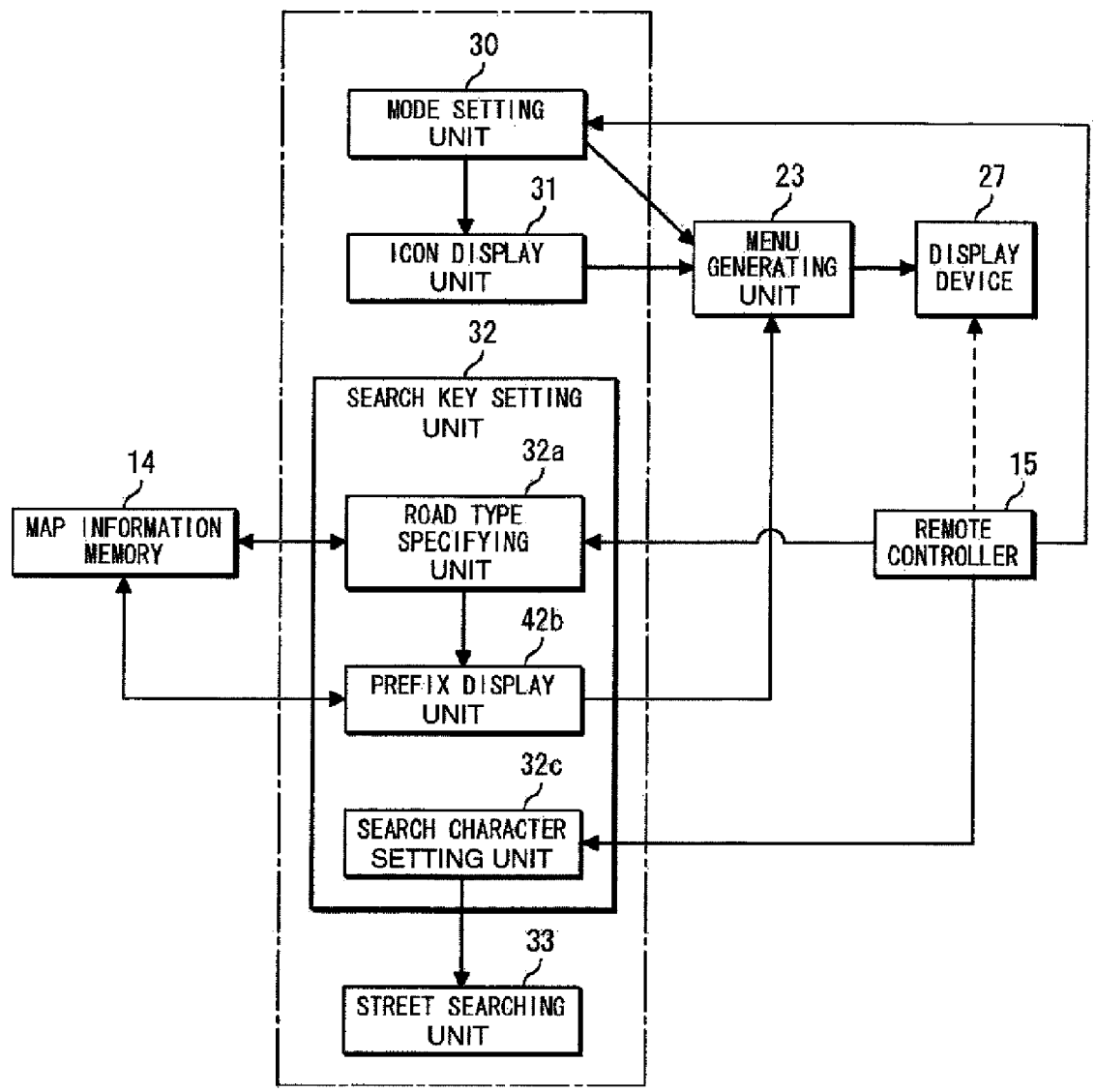
FIG. 5 is a block diagram of a roadway search unit of the navigation system according to a second embodiment.

Next, description will be made for a second embodiment according to the present invention. The navigation system according to the second embodiment is the same as the block diagram shown in FIG. 1. FIG. 5 is a block diagram of the roadway search unit of the navigation system of the second embodiment. In FIG. 5, the elements having like reference numerals as the reference numerals shown in FIG. 2 have the same functions as the elements described above with regard to FIG. 2, and are therefore not described with regard to FIG. 5. FIG. 6 illustrates examples of screens displayed on the display device 27 when searching for a roadway according to the second embodiment.

As with the first embodiment, the navigation system according to the second embodiment includes a plurality of modes of searching for a destination of a guidance route such as the Japanese syllable input search mode, address input search mode, telephone number input search mode, postal code input search mode, latitude/longitude input search mode, facility genre search mode, and road search mode. However, the second embodiment does not include the two different roadway search modes of the first embodiment, i.e. the highway search mode and the street search mode.

In the second embodiment, when the road search mode is set the icon display unit 31 controls the menu generating unit 23 to display a menu screen as in FIG. 6(a). The menu screen in FIG. 6(a) is a combination of the icon selection screen shown in FIG. 4(b) and the street name input screen shown in FIG. 4(d). Thus in the second embodiment, the user can search for a roadway by either directly inputting a street name or selecting a roadway icon displayed on the menu screen of FIG. 6(a).

When an icon is selected from the icons displayed on the screen by the icon display unit 31 through a user operation of the remote controller 15, as in FIG. 6(a), the road type specifying unit 32a specifies the road type information corresponding to the selected icon stored on the map information memory 14 (information storage unit).

As shown in FIG. 5, the second embodiment uses a prefix display unit 42b instead of the list display unit 32b explained in the first embodiment. The prefix display unit 42b displays the prefix of a highway name corresponding to the road type on the screen based on the road type information specified by the road type specifying unit 32a in order to prompt the user to input a route number for the desired road. Specifically, when an icon is selected on the menu screen of FIG. 6(a) through a user operation of the remote controller 15, the prefix display unit 42b controls the menu generating unit 23 and inputs the prefix of a road type corresponding to the selected icon in a roadway name entry field, as shown in FIGS. 6(b) to (d).

The user can complete a roadway name by operating the remote controller 15 to input a roadway route number after the prefix. The search character setting unit 32c sets a roadway name, which has been completed by inputting the route number through a user operation of the remote controller 15, as a search key for a roadway search. Meanwhile, a user who accurately knows a target roadway name can directly input the roadway name in the roadway name entry field. In this case, the search character setting unit 32c sets the roadway name input through the remote controller 15 as a search key.

Figure 7:
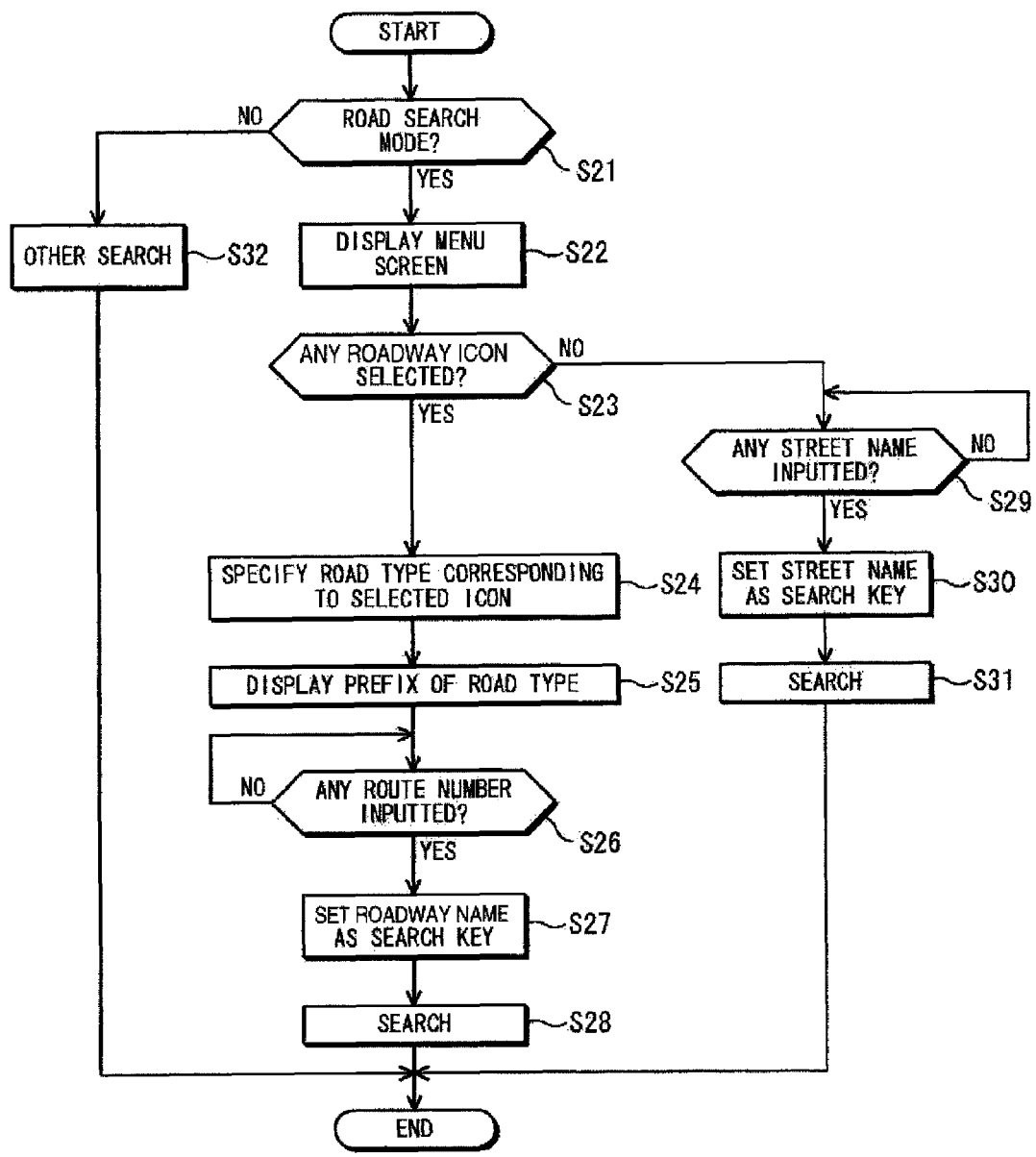
FIG. 7 is a flowchart of a roadway search method according to the second embodiment.

Next, a roadway search method according to the second embodiment will be described. FIG. 7 is a flowchart showing a roadway search method according to the second embodiment.

In FIG. 7, the mode setting unit 30 judges whether or not the road search mode has been set through a user operation of the remote controller 15 (step S21). In the case where the road search mode has not been set, that is, the mode setting unit 30 judges that a search mode other than the road search mode was set, a point search is executed according to the search mode that was previously set (step S32).

In the case where the mode setting unit 30 judges that the road search mode was set, the menu generating unit 23 displays a menu screen as shown in FIG. 6(a) on the display device 27 upon receiving a signal from the mode setting unit 30 (step S22) indicating that the road search mode has been set. Subsequently, the road type specifying unit 32a judges whether or not a roadway icon has been selected on the menu screen through a user operation of the remote controller 15 (step S23).

In the case where an icon has been selected, the road type specifying unit 32a specifies road type information corresponding to the selected icon by referring to icon layer data contained in the map data stored on the map information memory 14 (step S24). Once the road type is specified, the prefix display unit 42b displays the prefix of a roadway name corresponding to the specified road type on the screen, as in FIGS. 6(b) to (d), in order to prompt the user to input the route number for the roadway (step S25).

Next, the search character setting unit 32c judges whether or not a route number has been input after the prefix through the remote controller 15 (step S26). In the case where a route number has been input, the search character setting unit 32c sets the roadway completed by the input of the route number as a search key for a roadway search (step S27). Then, the street searching unit 33 searches the map data stored on the map information memory 14 for a roadway corresponding to the roadway name set as a search key by the search character setting unit 32c (step S28).

In the above-described act (step S23), in the case where the road type specifying unit 32a judges that a roadway icon has not been selected, the search character setting unit 32c judges whether or not any street name (highway name or general road name is acceptable) has been input through a user operation of the remote controller 15 (step S29). In the case where a street name has been input, the search character setting unit 32c sets the inputted street name as a search key (step S30).

The street searching unit 33 then searches the map data stored on the map information memory 14 for a street corresponding to the street name set as the search key by the search character setting unit 32c (step S31). As described above, in the case where the user clearly remembers a street name, he/she can also search the street name by inputting it directly.

As described above in detail, the second embodiment uses roadway icons as a shortcut key for inputting a prefix corresponding to a road type, unlike the first embodiment which contains two roadway search modes (highway search mode and street search mode), where highways and other roads are searched separately.

Specifically, as shown in FIG. 6(a), in the second embodiment icons similar to the icons/marks used on road signs for various road types are prepared and displayed in a list in order to prompt the user to select a desired icon from the displayed icons. The prefix of a road type corresponding to the selected icon is then displayed on the screen to make the user input the route number in order to complete the desired roadway name, and the completed roadway name is set as a search key.

In the second embodiment, as long as the user knows the icon and the route number of a roadway to be searched, the user can easily search for a target roadway even if he/she does not accurately know which prefix should be used for the desired road type. Further, in the second embodiment, there is no need to seek a desired roadway name out of a plurality of roadway names displayed in a list as in FIG. 4(c). Thus, in the second embodiment the user can set a roadway name as a search key more easily by directly inputting a route number that he/she originally recognizes.

Third Embodiment

Figure 8:
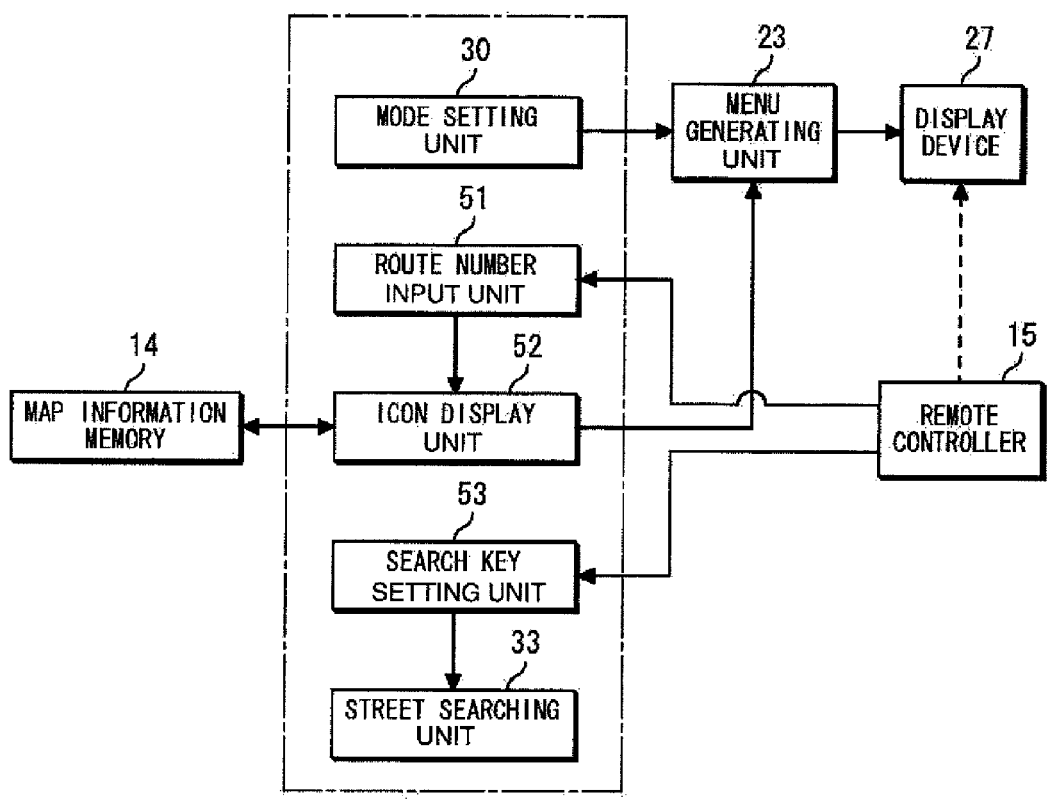
FIG. 8 is a block diagram of the roadway search unit of the navigation system according to a third embodiment.

Next, a third embodiment according to the present invention will be described. The navigation system according to the third embodiment is the same as the block diagram shown in FIG. 1. FIG. 8 is a block diagram showing the roadway search unit of the navigation system of the third embodiment. FIG. 9 illustrates examples of a screen displayed on the display device 27 when searching for a roadway in the third embodiment.

In the third embodiment, the navigation system includes the same roadway search modes as the second embodiment. However, as shown in FIG. 9(a), in the third embodiment, when the road search mode is set the menu generating unit 23 displays a menu screen on the display device 27 upon receiving a signal from the mode setting unit 30 indicating that the road search mode has been set. The menu screen of FIG. 9(a) is the same as the street name input screen shown in FIG. 4(d). The user may input characters by either directly inputting a street name or inputting only roadway route number on the menu screen of FIG. 9(a).

In FIG. 8, a route number input unit 51 accepts the input of a roadway route number into the menu screen shown in FIG. 9(a) through a user operation of the remote controller 15. The route number input unit 51 includes the CPU 17, the ROM 18 and the RAM 19 of FIG. 1.

An icon display unit 52 specifies roadways having a route number inputted by the route number input unit 51 from the map data stored in the map information memory 14 or the DVD-ROM 11. The icon display unit 52 controls the menu generating unit 23 to display an icon corresponding to the road type of the specified roadway on the screen, and prompts the user to select an icon.

As described above, the link table includes road type flags expressing road types and route number information for roads. A roadway corresponding to the route number input by the route number input unit 51 can be specified by referring to the route number information for each link. Further, the road type of the specified roadway can be obtained by referring to the road type flags. Thus, it is possible to specify an icon corresponding to the road type of the specified roadway and display the specified icon on the display device 27.

Specifically, one or more roadways corresponding to the route number input by the route number input unit 51 may exist in the map data, as well as route number information and a road type flag added to the link of each appropriate roadway. Thus, the icon display unit 52 extracts the one or more roadways corresponding to the route number specified by the route number input unit 51 out of the total number of roadways that exist in the map data, and displays an icon corresponding to the road type on a menu screen, as in FIG. 9(b). The icon (which corresponds to the shape of the road sign mark in which route number is written) displayed in this case may be previously prepared in the map data, or the figure of the route number may be generated by synthesizing it with a shape-only icon.

Meanwhile, the icon display unit 52 may display an icon corresponding to the road type having the inputted route number together with a roadway name generated by adding a prefix corresponding to a road type before the route number, as shown in FIG. 9(b). Furthermore, a road having the inputted route number is not limited to highways, and a general road corresponding to the same number may exist. In the case where a general road corresponding to the inputted route number exists in the map data, the street name of the general road may also be displayed, as shown in FIG. 9(b).

A search key setting unit 53 sets the roadway name corresponding to the icon selected out of the icons displayed on the screen by the icon display unit 52 as a search key through a user operation of the remote controller 15. The roadway name in this case is generated by adding a prefix corresponding to a highway road type before the route number input by the route number input unit 51. Meanwhile, a user that accurately knows a target roadway name from the beginning can directly input the roadway name through the remote controller 15. In this case, the search key setting unit 53 sets the inputted roadway name as a search key according to the remote controller input.

Figure 10:
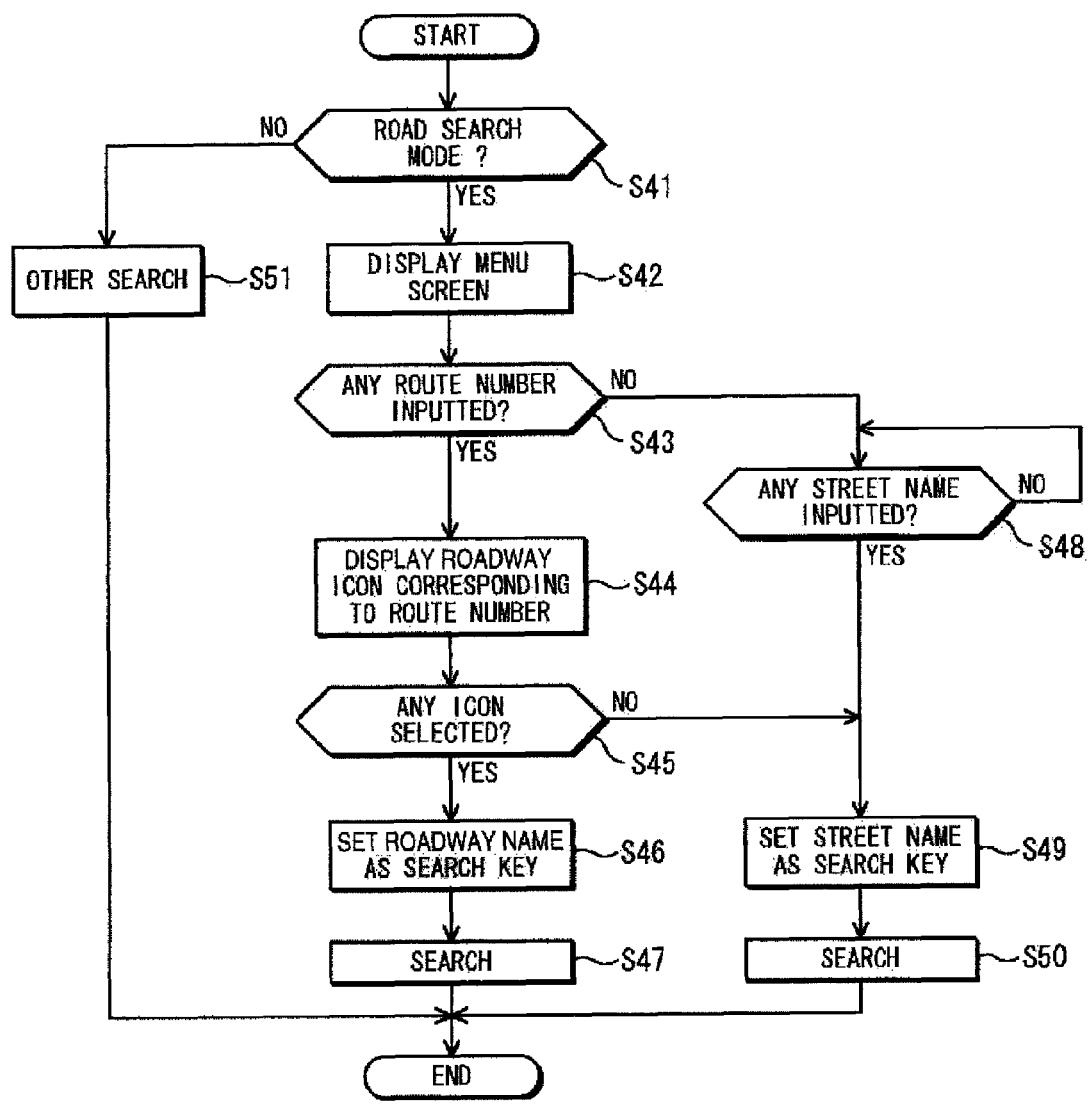
FIG. 10 is a flowchart of a roadway search method according to the third embodiment.

Next, a roadway search method according to the third embodiment will be described. FIG. 10 is a flowchart of the roadway search method according to the third embodiment.

In FIG. 10, the mode setting unit 30 judges whether or not the road search mode has been set through a user operation of the remote controller 15 (step S41). In the case where the road search mode has not been set, that is, the mode setting unit 30 has judged that another search mode was set, a point search is executed according to the previously set search mode (step S51).

In the case where the mode setting unit 30 judges that the road search mode was set, the menu generating unit 23 displays a menu screen, as shown in FIG. 9(a), on the display device 27 upon receiving a signal from the mode setting unit 30 indicating that the road search mode has been set (step S42). Subsequently, the route number input unit 51 judges whether or not a roadway route number has been input through the menu screen through a user operation of the remote controller 15 (step S43).

In the case where a route number has been input by the route number input unit 51, the icon display unit 52 displays roadway icons corresponding to the inputted route number on the screen, as in FIG. 9(b), in order to prompt the user to select one of the displayed icons (step S44). In the example of FIG. 9(b), street names of general roads are displayed on the screen in addition to various icons of highways to allow the user to select either a highway or a general road.

Next, the search key setting unit 53 judges whether or not an icon has been selected through a user operation of the remote controller 15 (step S45). In the case where an icon has been selected, the search key setting unit 53 sets a roadway name corresponding to the selected icon as a search key for a roadway search (step S46). Then, the street searching unit 33 searches the map data stored on the map information memory 14 for a roadway corresponding to the roadway name set as the search key by the search key setting unit 53 (step S47).

In the above-described act (step S43), when a roadway route number is judged to have not been inputted, the search key setting unit 53 judges whether or not any street name (either a highway name or general road name is acceptable) has been inputted through a user operation of the remote controller 15 (step S48). In the case where a street name has been inputted, the search key setting unit 53 sets the inputted street name as a search key (step S49).

Further, in the above-described act (step S45), in the case where the search key setting unit 53 judges that an icon was not selected on the menu screen of FIG. 9(*b*), that is, when the search key setting unit 53 judges that the street name of a general road was selected, the search key setting unit 53 sets the selected street name as a search key (step S49). Then, the street searching unit 33 searches the map data stored on the map information memory 14 for a street corresponding to the street name that has been set as the search key by the search key setting unit 53 (step S50).

As described above in detail, in the third embodiment, unlike the second embodiment where a roadway icon is selected first, a roadway route number is inputted first and roadway icons are displayed afterward. The user is then prompted to select one of the displayed icons.

In the third embodiment a user can easily search for a target roadway even if he/she does not accurately know which prefix should be used for the road type, provided the user knows the icon and the route number of a roadway to be searched. Further, in the third embodiment, since the route number is input first and general roads are displayed in a list together with highways corresponding to the route number, it is possible to set a roadway name as a search key more easily for both highways and general roads.

Fourth Embodiment

Next, a fourth embodiment according to the present invention will be described. The navigation system according to the fourth embodiment is the same as the block diagram shown in FIG. 1. In the above-described first through third embodiments, icons for each highway road type were displayed on the display device 27 in a list (see FIG. 4(*b*), FIG. 6(*a*), FIG. 9(*b*)). In contrast, in the fourth embodiment, icons for each road type are displayed on the roads of the map displayed on the screen of the display device 27.

FIG. 11 illustrates an example of screens displayed on the display device 27 when searching for a roadway according to the fourth embodiment. As shown in FIG. 11(*a*), icons for each road type are displayed on the roads of the map displayed on the screen of the display device 27. In the fourth embodiment, the display device 27 has a touch panel structure. When the user touches the panel to select an icon displayed on a road, the road type specifying unit 32*a* specifies road type information corresponding to the selected icon in a manner similar to that described with regard to the first embodiment. Then, the list display unit 32*b* obtains one or more roadway names corresponding to the specified road type from the map data, and displays a list of the roadway names, as shown in FIGS. 11(*b*) to (*d*) for example, and prompts the user to select a roadway name.

In the fourth embodiment, the user can easily search for a target highway even if he/she does not accurately know which prefix should be used for the desired road type, as long as he/she knows the icon and the route number of the roadway to be searched. Further, in the fourth embodiment, since roadway icons are displayed on the roads of the map displayed on the screen from the beginning, the processing step of displaying an icon list can be omitted, and a desired roadway name can be set using fewer steps.

In the above-described first through fourth embodiments, description has been made using the remote controller 15 as an operating unit, however, the operating unit may be constituted by a touch panel type display device 27.

Further, although the two types of roadway search modes, the street search mode and the highway search mode are described as being included only in the first embodiment, the two roadway search modes may be included in the second, third and fourth embodiments. Additionally, the roadway icons for each road type may be displayed only when the highway search mode is specified in the second to the fourth embodiments.

Further, although description has been made for the example of displaying icons together with the list of roadway names in the above-described first and fourth embodiments, the list of roadway names may be displayed without the icons. Alternatively, the roadway icons (with applied route numbers) may be displayed without the list of roadway names. Further, although the third embodiment has been described as displaying roadway names together with roadway icons (with applied route numbers) in the third embodiment, alternatively, only the icons may be displayed.

According to the present invention, even if the user does not accurately know the name of a desired roadway, the roadway name can be set as a search key with the help of icons constituted by marks similar to those used on road signs and on maps. Therefore, as long as the user knows the icon and the route number of a roadway to be searched, he/she can easily search for a target roadway even if he/she does not accurately know which prefix should be used for the desired road type.

Furthermore, although the first through fourth embodiments have been described above as storing icons by each road type, along with associated road type information in the map information memory 14, the invention is not limited thereto. For example, icons for each road type and road type information may be stored on separate storage units. Moreover, information related to icons and road type may also be stored on separate storage units.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed:

1. A navigation system, comprising:
    an icon display unit, comprising a processor, that displays a plurality of icons corresponding to a plurality of road types on a screen of a display, wherein the plurality of icons are displayed by road type;
    a search key setting unit that specifies a road type corresponding to an icon selected by a user through an operating unit from the plurality of icons displayed on the screen of the display, displays a list of roadway names having the specified road type on the screen of the display, and sets a roadway name selected by the user from the list as a search key for a roadway search; and,
    an information storage unit that stores each of the plurality of icons and information associated with each road type, wherein each of the plurality of icons is stored by road type;
    wherein the search key setting unit further includes:

a road type specifying unit configured to initially specify road type information corresponding to the selected icon by referring to data stored on the information storage unit; and a list display unit configured to retrieve one or more roadway names from data stored on the information storage unit based on the road type information specified by the road type specifying unit, and thereafter display a list of the retrieved one or more roadway names on the screen of the display;

wherein the one or more roadway names retrieved from the data correspond to the road type of the selected icon, and wherein the search key setting unit is configured to set the roadway name selected by the user through the operating unit from the list of retrieved roadway names displayed on the screen of the display as the search key.

2. The navigation system according to claim 1, wherein the search key setting unit displays the one or more roadway names retrieved from the data together with one or more icons corresponding to road types displayed on the screen of the display.

3. The navigation system according to claim 1, wherein the icon display unit displays the plurality of icons in a list on the screen of the display by road type.

4. The navigation system according to claim 1, further comprising:
a mode setting unit configured to set a search mode to a highway search mode, wherein when the highway search mode is set by the mode setting unit, the icon display unit displays the icons by road type on the screen of the display.

5. The navigation system according to claim 1, wherein the icon display unit displays the icons by road type on roads shown on a map displayed on the screen of a display.

6. A navigation system, comprising:
an icon display unit, comprising a processor, that displays a plurality of icons corresponding to a plurality of road types on a screen of a display, wherein the plurality of icons are displayed by road type;

a search key setting unit that specifies a road type corresponding to an icon selected by a user through an operating unit from the plurality of icons displayed on the screen of the display, displays a highway prefix for the specified road type on the screen of the display, and sets a roadway name selected by the user as a search key for a roadway search; and, an information storage unit configured to store the icons and information associated with the road type, wherein the icons are stored by road type;

wherein the search key setting unit further comprises:
a road type specifying unit configured to initially specify road type information corresponding to the icon selected by referring to data stored on the information storage unit; and a prefix display unit configured to thereafter display a highway prefix for a roadway name based on the road type information specified by the road type specifying unit;

wherein the highway prefix corresponds to the road type of the selected icon, and wherein the search key setting unit sets the roadway name and a route number selected by the user through the operating unit as the search key.

7. The navigation system according to claim 6, wherein the icon display unit displays the plurality of icons in a list on the screen of the display by road type.

8. The navigation system according to claim 6, further comprising:
a mode setting unit configured to set a search mode to a highway search mode, wherein when the highway search mode is set by the mode setting unit, the icon display unit displays the icons by road type on the screen of the display.

9. The navigation system according to claim 6, wherein the icon display unit displays the icons by road type on roads shown on a map displayed on the screen of a display.

10. A navigation system, comprising:
a route number input unit configured to initially receive a roadway route number from a user through an operating unit;

an icon display unit, comprising a processor, configured to retrieve one or more roadway names from data corresponding to the roadway route number, and thereafter display on the screen of a display a plurality of icons corresponding to a specified road type of the one or more roadway names; and a search key setting unit configured to set, as a roadway search key, the roadway name corresponding to the roadway route number and an icon selected by the user through the operating unit from the plurality of icons displayed on the screen of the display;

wherein the icon display unit displays icons corresponding to roadway names that correspond to the route number received by the route number input unit, together with roadway names generated by adding a prefix before the route number that corresponds to the specified road type.

11. A roadway search method, comprising:
displaying, by an icon display unit comprising a processor, roadway icons by road type on the screen of a display;

specifying road type information stored on an information storage unit that corresponds to a roadway icon selected by a user through an operating unit from the roadway icons displayed on the screen of the display, wherein the information storage unit stores icons by road type and information associated with each road type;

displaying a prefix for a roadway name corresponding to the roadway icon selected from the roadway icons displayed on the screen of the display, wherein the prefix is based on the specified road type information;

setting as a search key for the roadway search, a roadway name completed by the input of a route number by a user through the operating unit; and searching data stored on the information storage unit for a roadway corresponding to the roadway name set as the search key for a roadway search.

12. A roadway search method, comprising:
accepting a roadway route number input by a user through an operating unit;

retrieving one or more roadways associated with the accepted roadway route number from data stored on an information storage unit in order to specify a road type for each of the one or more roadways;

displaying, by an icon display unit comprising a processor, icons corresponding to the specified road types on the screen of a display;

setting a roadway name corresponding to an icon selected by the user through the operating unit from the icons displayed on the screen of the display as a search key for conducting a roadway search; and searching the data for a roadway corresponding to the roadway name set as the search key wherein the icons corresponding to roadways having the roadway route number input by the operating unit are displayed on the screen of a display together with roadway names generated by adding a prefix corresponding to the specified road type before the roadway route number.

* * * * *